(12) United States Patent
Khalil et al.

(10) Patent No.: US 9,374,361 B2
(45) Date of Patent: Jun. 21, 2016

(54) CROSS-NATIVE APPLICATION AUTHENTICATION APPLICATION

(71) Applicant: Verizon Patent and Licensing Inc., Arlington, VA (US)

(72) Inventors: Manah M. Khalil, Coppell, TX (US); Michael R. Lamison, Tampa, FL (US); Bo Xiao, Irving, TX (US); Omar A. Abou-Khamis, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 33 days.

(21) Appl. No.: 14/323,403

(22) Filed: Jul. 3, 2014

(65) Prior Publication Data
US 2016/0006719 A1    Jan. 7, 2016

(51) Int. Cl.
G06F 17/00    (2006.01)
G06F 15/16    (2006.01)
G06F 17/30    (2006.01)
H04L 29/06    (2006.01)

(52) U.S. Cl.
CPC ........ H04L 63/0815 (2013.01); H04L 63/0428 (2013.01); H04L 63/0884 (2013.01); H04L 63/101 (2013.01)

(58) Field of Classification Search
CPC .................................................. H04L 63/0815
USPC ............................................................. 726/8
See application file for complete search history.

(56) References Cited

U.S. PATENT DOCUMENTS

| | | | | |
|---|---|---|---|---|
| 8,650,303 | B1* | 2/2014 | Lang | G06F 21/51 709/226 |
| 8,856,907 | B1* | 10/2014 | Tidd | H04L 63/0815 713/155 |
| 9,065,819 | B1* | 6/2015 | Shanmugam | H04L 63/0815 |
| 2008/0301784 | A1* | 12/2008 | Zhu | H04L 63/0823 726/5 |
| 2013/0086669 | A1* | 4/2013 | Sondhi | H04L 63/0815 726/8 |
| 2014/0082715 | A1* | 3/2014 | Grajek | H04L 63/0815 726/8 |
| 2014/0298420 | A1* | 10/2014 | Barton | H04L 63/10 726/4 |
| 2014/0331060 | A1* | 11/2014 | Hayton | G06F 21/31 713/186 |
| 2015/0033315 | A1* | 1/2015 | Gadamsetty | H04L 63/0815 726/8 |

OTHER PUBLICATIONS

Paul Madsen; Enabling SSO for native applications; Year:2013; Ping Identity; p. 1-21.*
Adobe, "Adobe Pass for TV Everywhere/Features", http://www.adobe.com/products/adobe-pass/features.html, Mar. 27, 2011, 2 pages.

(Continued)

Primary Examiner — Monjour Rahim

(57) ABSTRACT

A user device stores first authentication information used to grant access to a resource associated with a first application, and configuration information relating to a second application. The user device receives an authentication request from the second application requesting second authentication information. Based on the configuration information relating to the second application, the user device determines whether the first authentication information contains some or all of the requested second authentication information. The user device generates an authentication response to the authentication request, using the first authentication information, and sends the authentication response to the second application in order to permit access to a resource associated with the second application.

20 Claims, 8 Drawing Sheets

(56) References Cited

OTHER PUBLICATIONS

Adobe, "Adobe Pass for TV Everywhere", http://www.adobe.com/products/adobe-pass.html, Feb. 24, 2012, 1 page.

Apple Inc., "App Extension Programming Guide", https://developer.apple.com/library/prerelease/ios/documentation/General/Conceptual/ExtensibilityPG/ExtensibilityPG.pdf, Jun. 2, 2014, 83 pages.
Wikipedia, "Sandbox (computer security)", http://en.wikipedia.org/wiki/Sandbox_(computer_security), Jun. 5, 2014, 3 pages.

* cited by examiner

CROSS-NATIVE APPLICATION AUTHENTICATION APPLICATION

BACKGROUND

A user of a mobile device, such as a smart phone, often uses applications which require authentication for access to certain application content. Some of these applications may store and use the same credential and/or authentication information. Each application may isolate its stored information in one or more private repositories, preventing sharing of the information with other applications on the mobile device.

DETAILED DESCRIPTION OF PREFERRED EMBODIMENTS

The following detailed description of example implementations refers to the accompanying drawings. The same reference numbers in different drawings may identify the same or similar elements.

A user of a user device, such as a smart phone, may use applications on the user device to access various resources. Some of these resources may be protected (hereinafter referred to as "protected resources") by requiring the user to authenticate with one or more authentication servers. A user may be inconvenienced by having to separately authenticate within each application before accessing that application's protected resources. Implementations described herein may assist a user in accessing numerous applications' protected resources without having to separately authenticate within each application.

Figure 1B:
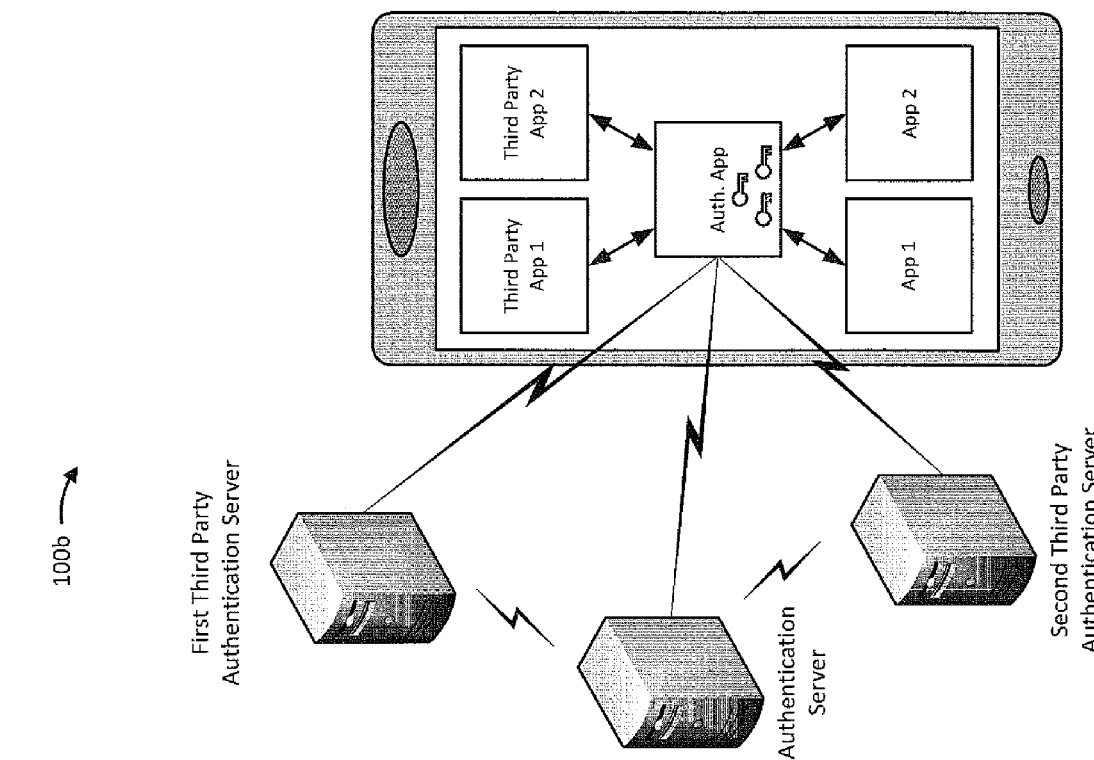
FIGS. 1A and 1B are diagrams of an overview of an example implementation described herein.
Figure 1A:
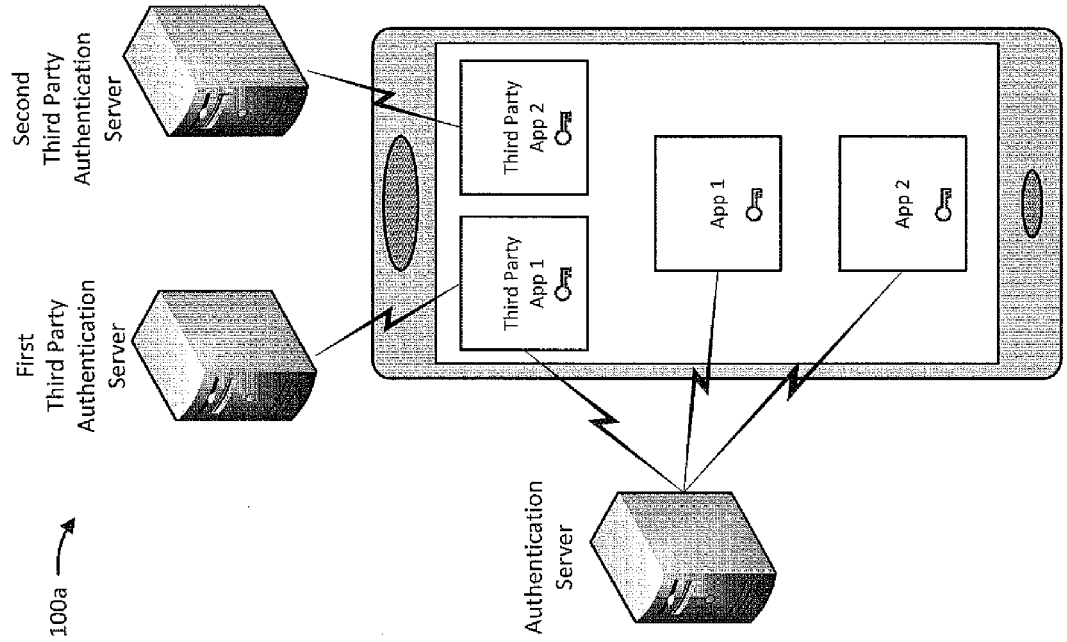

FIGS. 1A and 1B are diagrams of an overview of an example implementation described herein. As shown in FIG. 1A, a user device 100a, such as a smart phone, may include one or more applications and one or more third party applications. Assume that each of the applications authenticates separately with one or more external authentication servers, shown as authentication server, first third party authentication server, and second third party authentication server, in order to provide a user with authentication information for accessing protected resources. An application may, thus, communicate in a one-on-one manner with a particular external authentication server, and the application may independently maintain its authentication information from the particular authentication server. Each application may operate in a virtual sandbox on the user device which prevents a first application from accessing information stored by a second application. Additionally, or alternatively, the first and second applications may be programmed not to share information with each other. Thus, if a user authenticates with an authentication server using the first application and the user subsequently wishes to use the second application that requires the same authentication information as the first application, the user will be required to re-authenticate with that authentication server because the authentication information is not shared between the applications. This redundancy disrupts the user experience and may discourage some users from adopting certain applications.

As shown in FIG. 1B, a user device 100b, such as a smart phone, may include an authentication application as well as one or more other applications or third party applications. The authentication application may authenticate with an external authentication server, which may further communicate with other third party authentication servers. Alternatively, or additionally, the authentication application may authenticate directly with other third party servers. The authentication application may further maintain a repository of authentication information acquired from the authentication servers on behalf of other applications and third party applications. The other applications and third party applications may receive internal authentication from the authentication application based on the authentication information received from the external authentication servers and maintained in the authentication application's authentication repository. The authentication application may, thus, serve as hub for communicating one-on-one with the authentication server, and the other applications and third party applications may likewise behave as spokes which receive internal authentication from the hub authentication application. In this way, if an application requests authentication information that has already been received and maintained by the hub authentication application on behalf of another application, the hub authentication application may provide the authentication information to the requesting application without requiring the user to re-authenticate. The ability to share authentication information between applications via the hub authentication application, thus, prevents redundant authentication requests and enhances user experience.

Figure 2:
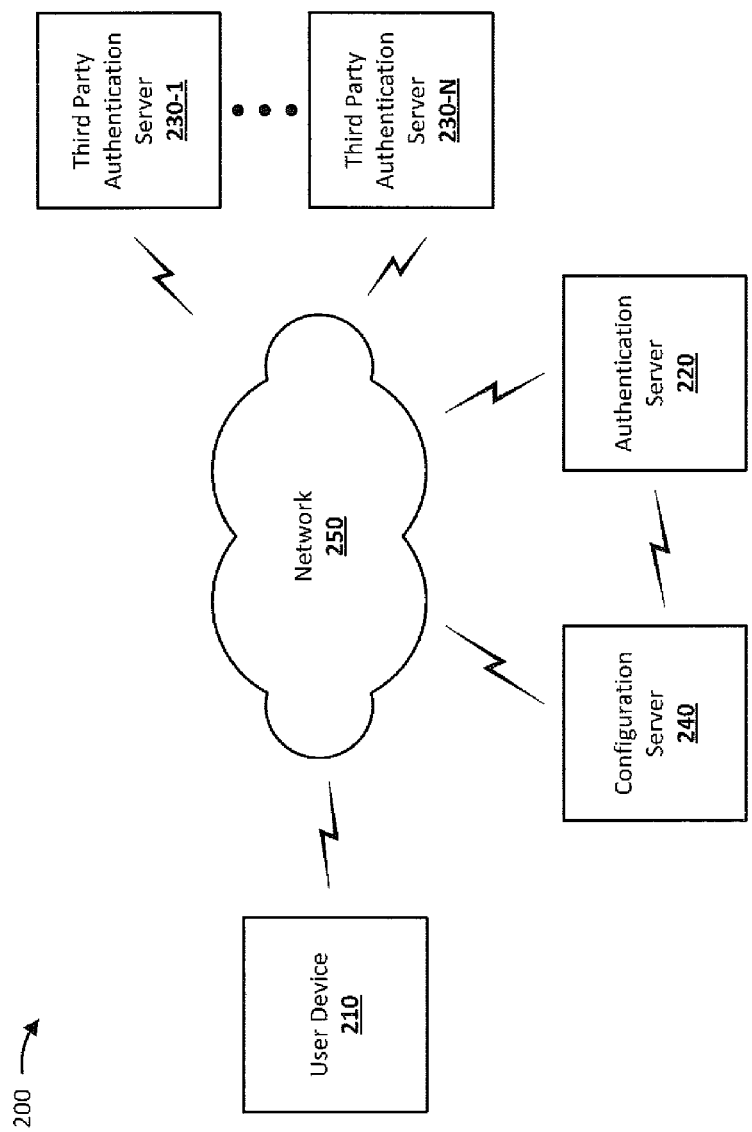
FIG. 2 is a diagram of an example environment in which systems and/or methods described herein may be implemented.

FIG. 2 is a diagram of an example network 200 in which systems and/or methods described herein may be implemented. As shown in FIG. 2, network 200 may include a user device 210; an authentication server 220; a group of third party authentication servers 230-1, . . . , 230-N (N>1) (hereinafter referred to collectively as "third party authentication servers 230" and individually as "third party authentication server 230"); a configuration server 240; and a network 250. Devices of network 200 may interconnect via wired connections, wireless connections, or a combination of wired and wireless connections.

User device 210 may include any computation or communication device, such as a wireless mobile communication device, that is capable of communicating via network 250. For example, user device 210 may include a radiotelephone, a personal communications system (PCS) terminal (e.g., that may combine a cellular radiotelephone with data processing and data communications capabilities), a personal digital assistant (PDA) (e.g., that can include a radiotelephone, a pager, Internet/intranet access, etc.), a landline telephone, a laptop computer, a tablet computer, a personal computer, a set top box (STB), a television, a camera, a personal gaming system, or another type of computation or communication device. In some implementations, user device 210 may store and execute an authentication application which receives authentication information from authentication server 220 and/or third party authentication servers 230 and receives configuration information from configuration server 240. The authentication application may receive authentication requests from applications executed on user device 210 and may further provide those applications with authentication information. The description to follow will generally refer to user device 210 as a wireless mobile device. The description is not limited, however, to a wireless mobile device and may equally apply to other types of user devices.

Authentication server 220 may include one or more server devices, or other types of computation or communication devices, that gather, process, search, store, and/or provide information in a manner similar to that described herein. For example, authentication server 220 may send authentication information to user device 210 based on an authentication request from user device 210. In another example, authentication server 220 may act as an intermediary by communicating an authentication request from user device 210 to a third party authentication server 230 and/or communicating authentication information from a third party authentication server 230 to user device 210 based on an authentication request sent from user device 210 to authentication server 220. In yet another example, authentication server 220 may send authentication information to user device 210 without user device 210 first sending an authentication request (e.g., to provide for automatic updating of authentication information received from authentication server 220). Alternatively, or additionally, authentication server 220 may be a single-sign on (SSO) server which provides authentication information on behalf of third party authentication servers 230. The authentication information may be used by the authentication application and/or other applications, running on user device 210, to authenticate the user, thereby providing access to protected resources.

Third party authentication server 230 may include one or more server devices, or other types of computation or communication devices, that gather, process, search, store, and/or provide information in a manner similar to that described herein. For example, third party authentication server 230 may send authentication information to user device 210 or authentication server 220 based on an authentication request from user device 210 or authentication server 220, respectively.

Configuration server 240 may include one or more server devices, or other types of computation or communication devices, that gather, process, search, store, and/or provide information in a manner similar to that described herein. For example configuration server 240 may send configuration information to user device 210 based on a configuration request from the authentication application running on user device 210. In another example, configuration server 220 may send authentication information to user device 210 without user device 210 first sending a configuration request (e.g., to provide for automatic updating of configuration information received from configuration server 220). The configuration information may be used by the authentication application, running on user device 210, to establish how and when the authentication application sends authentication and/or configuration requests.

Network 250 may include one or more wired and/or wireless networks. For example, network 250 may include a cellular network, the Public Land Mobile Network (PLMN), a second generation (2G) network, a third generation (3G) network, a fourth generation (4G) network, a fifth generation (5G) network, and/or another network. Additionally, or alternatively, network 250 may include a wide area network (WAN), a metropolitan area network (MAN), a telephone network (e.g., the Public Switched Telephone Network (PSTN)), an ad hoc network, an intranet, a fiber optic-based network, and/or a combination of these or other types of networks.

The number and arrangement of devices and networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
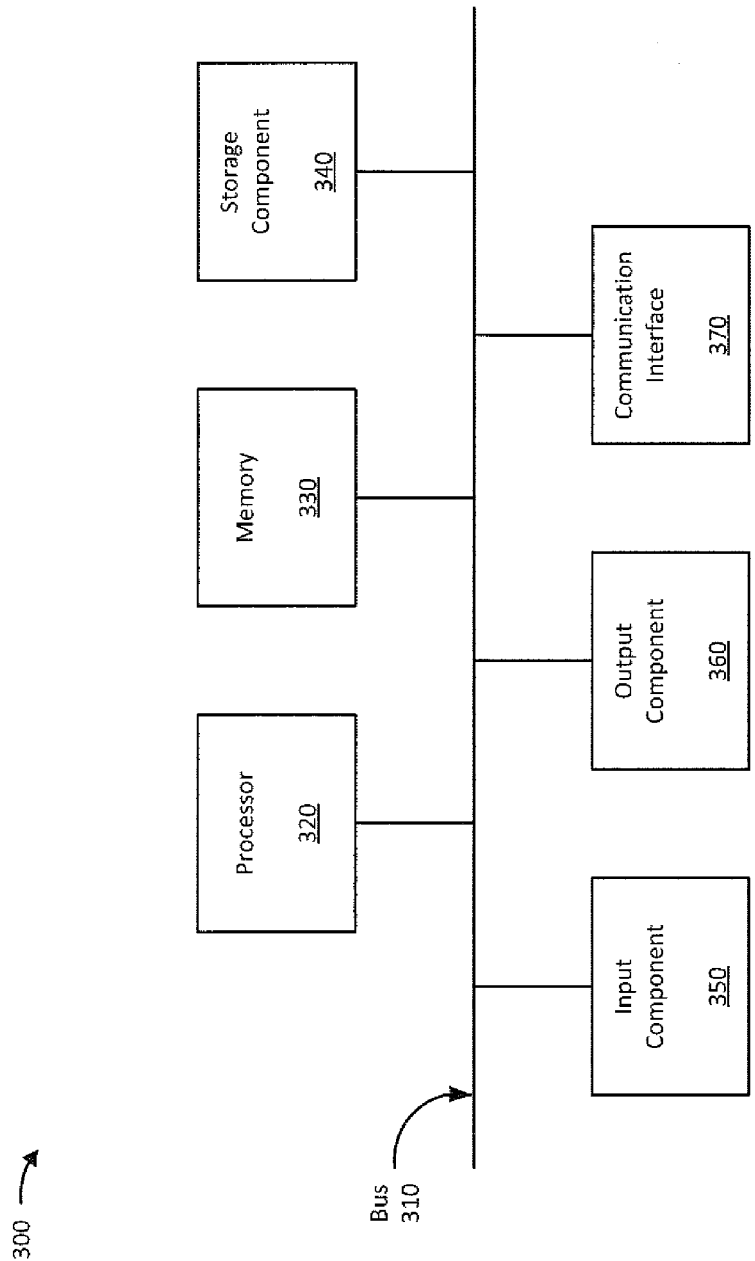
FIG. 3 is a diagram of example components of one or more of the devices of FIG. 2.

FIG. 3 is a diagram of example components of a device 300. Device 300 may correspond to user device 210, authentication server 220, third party authentication server 230, and/or configuration server 240. In some implementations, user device 210, authentication server 220, third party authentication server 230, and/or configuration server 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4C are diagrams of example data structures that may be used by the authentication application. As shown in FIG. 4A, information stored on a computer readable medium may include a credential repository data structure 400. For example, user device 210 and/or one or more of authentication servers 220, 230 may maintain credential data. Credential repository 400 data structure may include various information used to authenticate a user of user device 210, such as a name, a physical address, an e-mail address, a username, an account identifier, a password, a personal identification number (PIN), biometric data, or the like. Credential repository data structure 400 may, for example, allow a user to authenticate an application which uses some or all of the same authentication credentials as a previously authenticated application but may not use the authentication information of that previously authenticated application (e.g., the applications may use the same username/password but require different security tokens obtained from different authentication servers). Credential repository data structure 400, of FIG. 4A, includes several data fields for explanatory purposes. In practice, credential repository data structure 400, of FIG. 4A, may include additional fields, fewer fields, different fields, and/or differently arranged fields than are described with respect to credential repository data structure 400 of FIG. 4A.

As shown in FIG. 4B, information stored on a computer readable medium may include a configuration repository data structure 410. For example, user device 210, one or more of authentication servers 220, 230, and/or configuration server 240 may maintain configuration information in a configuration repository data structure 410. Configuration repository data structure 410 may include various information used to manage the configuration of an authentication application operating on user device 210, such as a white-list of applications which may invoke the authentication application, a black-list of applications which may not invoke the authentication application, trusted identification server information for identifying applications which invoke the authentication application, application permission information for determining what information may be shared with an application invoking the authentication application, authentication expiration information for determining validity of stored authentication information, authentication server(s) information for identifying authentication server(s) from which to request authentication information, update schedule information, etc.

Configuration repository data structure 410 may, for example, provide the ability to determine the identity of an application requesting authentication from the authentication application; whether the requesting application may invoke the authentication application, what authentication information that application may access; whether unexpired authentication information is already stored; and where, when, and how to obtain authentication information from one or more authentication server(s). As an example, white-list and/or black-list information may be used to prevent unauthorized applications from acquiring authentication information via the authentication application. As another example, application permission information stored in the repository data structure 410 may be used to prevent one application from accessing authentication information associated with another application. As yet another example, the authentication expiration information may be used to keep track of expiration information stored authentication information. Configuration repository data structure 410, of FIG. 4B, includes several data fields for explanatory purposes. In practice, configuration repository data structure 410, of FIG. 4B, may include additional fields, fewer fields, different fields, and/or differently arranged fields than are described with respect to configuration repository data structure 410 of FIG. 4B.

As shown in FIG. 4C, information stored on a computer readable medium may include an authentication repository data structure 420. For example, user device 210 and/or one or more of authentication servers 220, 230 may maintain authentication data. Authentication repository 420 data structure may include various authentication information for a user of user device 210, such as one or more security tokens from one or more authentication servers. Authentication repository data structure 420 may, for example, allow a user to authenticate an application using some or all of the same authentication information as a previously authenticated application (e.g., the applications may use the same security tokens which may be obtained from the same authentication server(s)). Authentication repository data structure 420, of FIG. 4C, includes several data fields for explanatory purposes. In practice, authentication repository data structure 420, of FIG. 4C, may include additional fields, fewer fields, different fields, and/or differently arranged fields than are described with respect to authentication repository data structure 420 of FIG. 4C.

Figure 5:
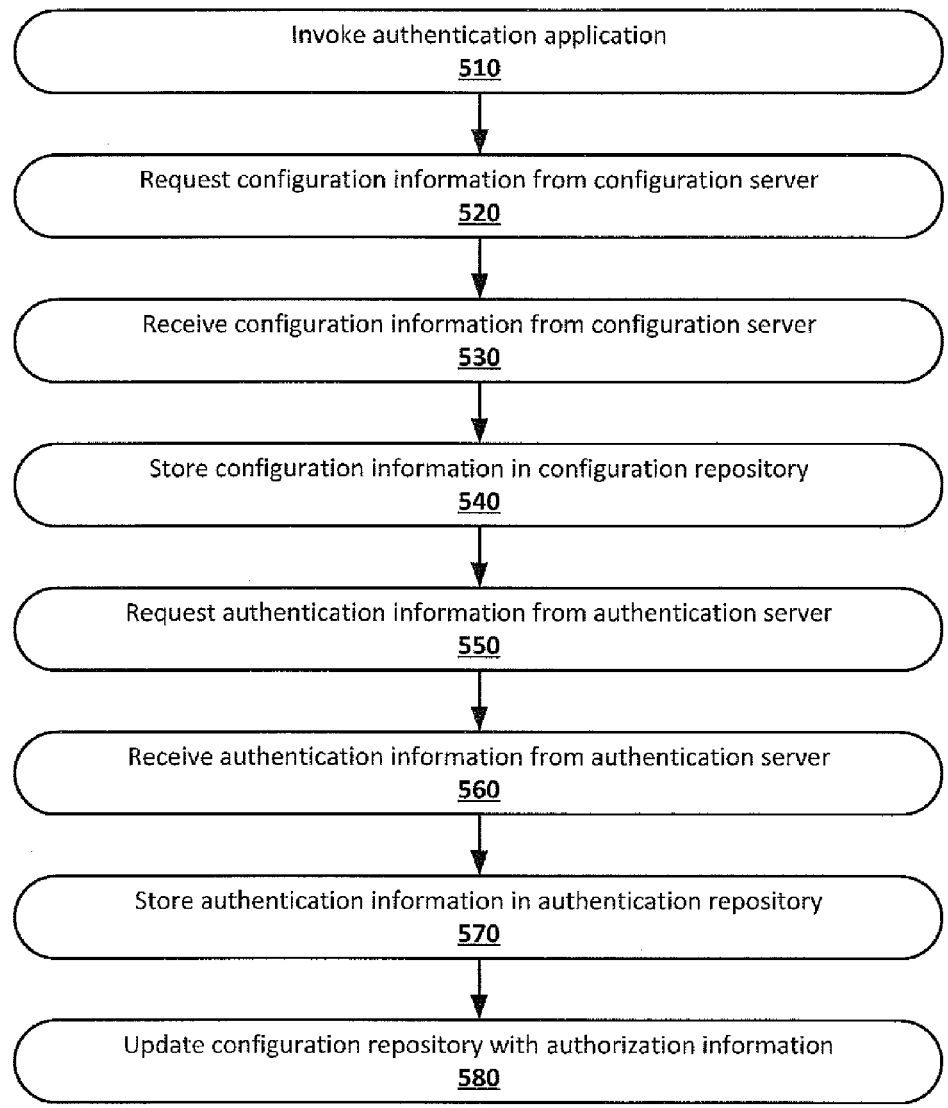
FIG. 5 is a flowchart of an example process for setting up an authentication application.

FIG. 5 is a flow chart of an example process for setting up an authentication application. In some implementations, process 500 may be performed by user device 210. Additionally, or alternatively, one or more process blocks of FIG. 5 may be performed by another device or a group of devices separate from or including user device 210, such as authentication server 220, third party authentication server 230, and/or configuration server 240.

As shown in FIG. 5, process 500 may include invoking an authentication application (block 510). For example, user device 210 may receive input (e.g., from a user of user device 210 and/or from another device, such as authentication server 220 or configuration server 240) which causes user device 210 to execute the authentication application, which may be stored in memory accessible by user device 210. In some implementations, a user may provide input to user device 210, and user device 210 may invoke the authentication application based on receiving the user input. Additionally, or alternatively, user device 210 may determine whether a condition is met and may invoke the authentication application based on the condition being met. In some implementations, user device 210 may invoke the authentication application based on multiple conditions being met. The condition(s) may be stored in a configuration repository (e.g., configuration repository data structure 410) in memory accessible by user device 210.

In some implementations, the condition may be based on time, such as a time of day (e.g., before or after a particular time, within a particular time range, etc.), a date (e.g., a month, day, and/or year), a day of the week (e.g., Monday, Tuesday, etc., a weekday, a weekend), a particular week or set of weeks, a particular month or set of months, a particular season (e.g., spring, summer, fall, winter), a particular year, etc. The condition may be based on input from a user of user device 210 (e.g., a user-programmed update schedule) and/or authentication information received from authentication server(s) 220,230 (e.g., based on expiration information) and/or configuration information received from configuration server 240 (e.g., based on a server-side update schedule).

In some implementations, the condition may be based on a network connectivity of user device 210, such as whether user device 210 is connected to a particular type of network, such as a radio access network (RAN), a local area network (LAN)/personal area network (PAN) (e.g., a Bluetooth network, a WiFi network, an ultra-wideband network, etc.), whether user device 210 is connected to a particular network, such as a network identifiable by particular access credentials, such as a username and password (e.g., a user's home network, a Bluetooth network in a user's car, a network at a particular merchant location, a network connection to another user device 210, etc.), etc.

In some implementations, the condition may be based on a request from another application, running on user device 210, which authenticates using the authentication application. The other application may invoke the authentication application using a deep link or application extension. Additionally, or alternatively, the other application may invoke the authentication application by creating or modifying a monitored memory or storage location accessible by user device 210.

As also shown in FIG. 5, process 500 may include requesting configuration information from a configuration server (block 520). For example, the authentication application, once invoked on user device 210, may receive input (e.g., from a user of user device 210 and/or from another device, such as authentication server 220 or configuration server 240) which causes user device 210 to send a configuration request to configuration server 240. User device 210 may also send the configuration request based on one or more conditions similar to those described with respect to block 510. User device 210 may send the configuration request via network 250 using an appropriate communications protocol, e.g., Hypertext Transfer Protocol (HTTP) or File Transfer Protocol (FTP), which may further be secured with an appropriate cryptographic protocol, e.g., Transport Layer Security (TLS) or Secure Sockets Layer (SSL).

The configuration request may include information associated with user device 210 (e.g., a device identifier), a user of user device 210 (e.g., a user identifier), and/or information associated with the authentication application (e.g., an application identifier) on user device 210.

As also shown in FIG. 5, process 500 may include receiving the requested configuration information from the configuration server (block 530). For example, the authentication application may receive configuration information from configuration server 240 based on the configuration request sent from user device 210 and/or based on conditions independent of the configuration request (e.g., based on updates to configuration information stored on configuration server 240 and/or based on an improper authentication request to authentication server 220 from user device 210). User device 210 may receive the configuration information via network 250 using an appropriate communications protocol, e.g., HTTP or FTP, which may further be secured with an appropriate cryptographic protocol, e.g., TLS or SSL. Additionally, or alternatively, user device 210 may receive the configuration information from a data storage component accessible by user device 210.

The configuration information may include information for identifying which application(s) may request authentication; where, when, and how to obtain authentication for a requesting application; and what security and/or expiration policies apply to the authentication information obtained for a requesting application. In one example, the configuration information may include a white-list of applications which may be authenticated using the authentication application invoked on user device 210. The configuration information may further include one or more network addresses (e.g., one or more uniform resource identifiers/locators (URIs/URLs)) which define the locations of authentication server 220 and third party authentication servers 230 to which authentication requests are sent. The configuration information may also include expiration times for authentication information. The configuration information may also include access restrictions which prevent or allow certain applications from accessing certain portions of authentication information which may be stored in the authentication application's authentication repository.

As also shown in FIG. 5, process 500 may include storing the received configuration information in a configuration repository (block 540). For example, the authentication application may store the received configuration information in a configuration repository (e.g., configuration repository data structure 410), which may be located in memory accessible by user device 210.

As also shown in FIG. 5, process 500 may include requesting authentication information from an authentication server (block 550). For example, the authentication application may receive input (e.g., from a user of user device 210 and/or from another device, such as authentication server 220 or configuration server 240) which causes user device 210 to send an authentication request to authentication server 220 and/or third party authentication server 230 based on configuration information stored in the configuration repository (e.g., configuration repository data structure 410). User device 210 may also send the authentication request based on one or more conditions similar to those described with respect to block 510. User device 210 may send the authentication request via network 250 using an appropriate communications protocol, e.g., HTTP or FTP, which may further be secured with an appropriate cryptographic protocol, e.g., TLS or SSL.

The authentication request may include a security token and/or identity information associated with a user (e.g., credentials stored in credential repository data structure 400). The authentication request may also include information associated with user device 210 (e.g., a device identifier), and/or information associated with an application (e.g., an application identifier) on user device 210. The authentication request may also include information associated with third party server 230 (e.g., a device identifier, an IP address, a MAC address, a URI/URL, etc.) so authentication server 220 may authenticate with third party server 230 on behalf of user device 210.

As also shown in FIG. 5, process 500 may include receiving authentication information from the authentication server (block 560). For example, the authentication application may receive authentication information from authentication server 220 based on the authentication request sent from user device 210 and/or based on conditions independent of the authentication request (e.g., based on updates to authentication information stored on authentication server 220 and/or third party authentication servers 230 and/or conditions described with respect to block 510). User device 210 may receive the authentication information via network 250 using an appropriate communications protocol, e.g., HTTP or FTP, which may further be secured with an appropriate cryptographic protocol, e.g., TLS or SSL. Additionally, or alternatively, user device 210 may receive the authentication information from a data storage component accessible by user device 210.

The authentication information may include one or more security tokens from one or more authentication servers which authenticate the user of user device 210. A security token may be a physical device and/or software which may be used in addition to or in place of other credentials to authenticate a user. For example, a security token may contain cryptographic keys (e.g., a digital signature) or biometric data (e.g., fingerprint information).

As also shown in FIG. 5, process 500 may include storing the authentication information in an authentication repository (block 570). For example, the authentication application may store the received authentication information in, e.g., an authentication repository data structure 420, which may be located in memory accessible by user device 210.

As also shown in FIG. 5, process 500 may include updating the configuration repository with the received and stored authentication information (block 480). For example, the authentication application on user device 210 may update the configuration repository (e.g., configuration repository data structure 410) to reflect one or more expiration times associated with the received and stored authentication information.

While a series of blocks has been described with regard to FIG. 5, the blocks and/or the order of the blocks may be modified in some implementations. Additionally, or alternatively, non-dependent blocks may be performed in parallel.

Figure 6:
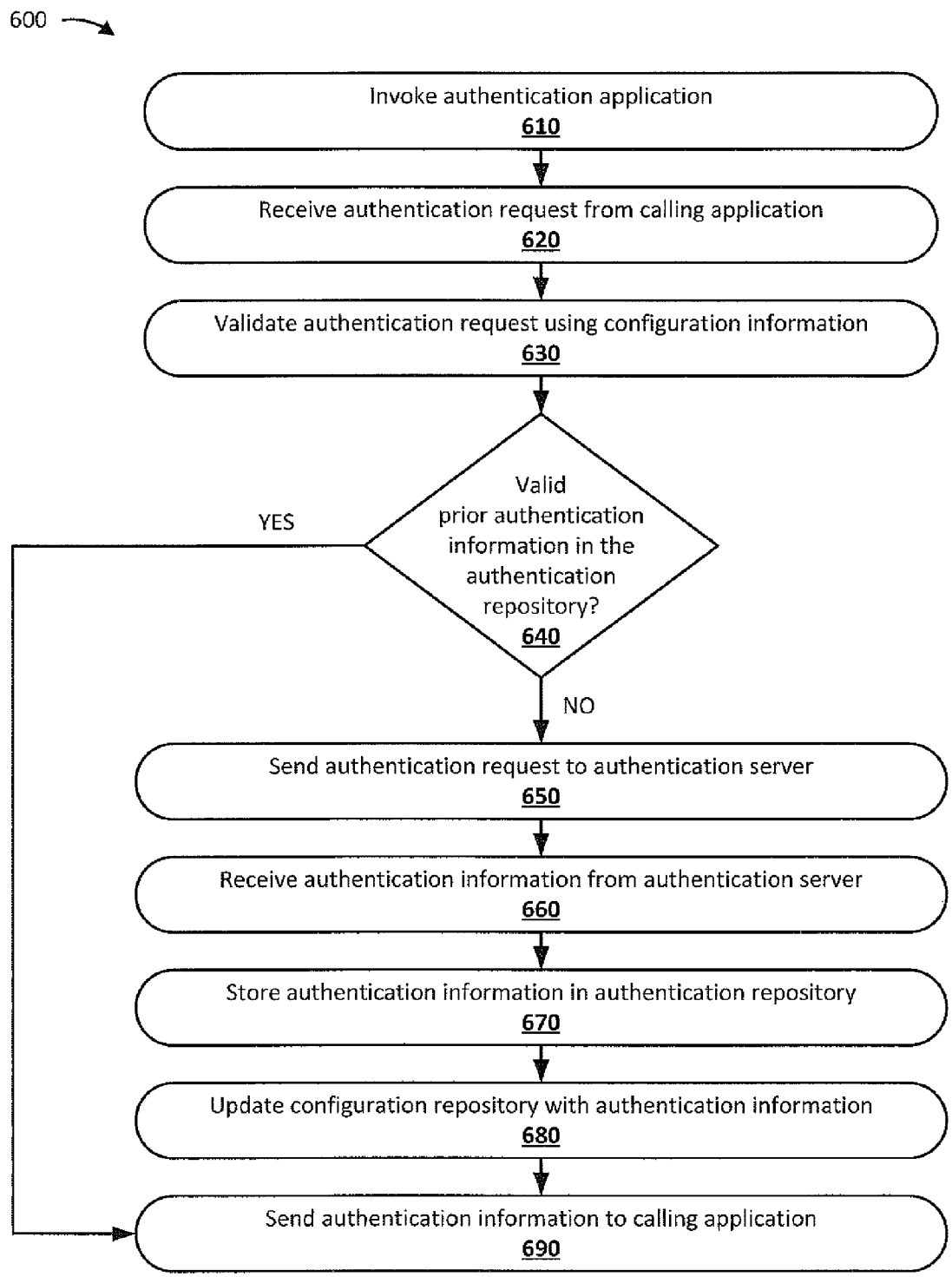
FIG. 6 is a flowchart of an example process for using an authentication application.

FIG. 6 is a flow chart of an example process for using an authentication application. In some implementations, process 600 may be performed by user device 210. Additionally, or alternatively, one or more process blocks of FIG. 6 may be performed by another device or a group of devices separate from or including user device 210, such as authentication server 220, third party authentication server 230, and/or configuration server 240.

As shown in FIG. 6, process 600 may include invoking an authentication application (block 610). For example, user device 210 may receive input (e.g., from a user of user device 210 and/or from another device, such as authentication server 220 or configuration server 240) which causes user device 210 to execute the authentication application, which may be located in memory accessible by user device 210. In some implementations, a user may provide input to user device 210, and user device 210 may invoke the authentication application based on receiving the user input. Additionally, or alternatively, user device 210 may determine whether a condition is met and may invoke the authentication application based on the condition being met. In some implementations, user device 210 may invoke the authentication application based on multiple conditions being met. The condition(s) may be stored in a configuration repository (e.g., configuration repository data structure 410) in memory accessible by user device 210. The conditions may be similar to those described with respect to block 510.

As also shown in FIG. 6, process 600 may include receiving an authentication request from a calling application (block 620). For example, the authentication application may receive, from the calling application, the authentication request using a deep link or application extension, which may be the same deep link or application extension that invoked the authentication application (block 610). The calling application may include a secret key (e.g., a randomly generated secret key) in the authentication request and may send the authentication request to the authentication application. Additionally, or alternatively, the authentication application may receive, from the calling application, the authentication request from a monitored memory location accessible by user device 210. The monitored memory location may be secured to be prevent access, by other applications, to the authentication information sent by the authentication application to the calling application.

As also shown in FIG. 6, process 600 may include validating the authentication request received from the calling application (block 630). For example, the authentication application on user device 210 may compare the authentication request received from the calling application with configuration information stored in the authentication application's configuration repository. To validate the authentication request, the authentication application may confirm that the calling application correctly identifies itself, that the calling application is identified in a white-list, that the calling application has authorization to access the requested authentication information, and/or that a user of user device 210 has permitted the calling application to request authentication from the authentication application.

The authentication application and/or calling application may use one or more external trusted servers (e.g., a trusted certificate authority) to verify information contained within the authentication request using, e.g., trusted digital certificates. Alternatively, or additionally, the authentication application and/or calling application may use a unique application identifier (e.g., a cryptographic hash) to verify the identity of the calling application.

Validation may include determining whether the user of user device 210 has given permission for the calling application to authenticate using the authentication application. If the user of user device 210 has not granted permission, or has denied permission, to the calling application, the authentication application may prompt the user of user device 210 to confirm information contained in and/or relating to the calling application and/or or the authentication request. The authentication application may further update the configuration information to reflect the user's confirmation.

Alternatively, or additionally, validation of a calling application may include an initial activation process wherein the user of user device 210 first performs a one-on-one authentication, with an authentication server, using the calling application. The calling application may further request and receive, from a trusted certificate authority associated with the authentication server, a digital signing certificate and associated public key, which may be stored in the calling application's authentication repository. After this initial activation process, subsequent authentication requests from the calling application may be directed to the authentication application by signing the authentication request with the stored signing certificate and including the public key to establish the identity of the calling application and/or the combined identity of the user and the calling application. The signing certificate may be unique per user and may serve as a confirmation that the user has given permission for the application to use the authentication application.

As also shown in FIG. 6, process 600 may include determining whether valid prior authentication information in an authentication repository matches the authentication request (block 640). For example, if the authentication application on user device 210 determines that valid prior authentication information in the authentication application's authentication repository (e.g., authentication repository data structure 420) satisfies the calling application's authentication request (block 640 is YES), the authentication application may return this authentication information to the calling application to authenticate the user of that application (as described with respect to block 690).

If the authentication application on user device 210 determines that prior authentication information in the authentication repository is not valid and/or does not satisfy the calling application's authentication request (block 640 is NO), the authentication application may send an authentication request to an authentication server (block 650). For example, the authentication application may send the authentication request to the authentication server in a manner similar to that described with respect to block 550. The authentication server may log the authentication request for auditing purposes.

The authentication application may also determine that some of the prior authentication information in the authentication application's authentication repository relates to the calling application's authentication request but that the related authentication information does not completely satisfy the calling application's authentication request. For example, the authentication application's authentication repository may contain some but not all requested authentication information or may contain some expired authentication information. Thus, the authentication application may request or update only the portion of authentication information needed to supplement the authentication information already in the authentication application's authentication repository in order to satisfy the authentication request from the calling application. Alternatively, or additionally, the authentication application may update valid authentication information (e.g., in anticipation of expiration or at the demand of the user).

As also shown in FIG. 6, process 600 may include receiving authentication information from the authentication server (block 660). For example, the authentication server may send the authentication information to the authentication application on user device 210 in a manner similar to that described with respect to block 560.

As also shown in FIG. 6, process 600 may include storing the authentication information received from the authentication server in the authentication repository (block 670). For example, the authentication application may store the authentication information on user device 210 in the authentication application's authentication repository in a manner similar to that described with respect to block 570.

As also shown in FIG. 6, process 600 may include updating a configuration repository with the authentication information received from the authentication server and stored in the authentication repository (block 680). For example, the authentication application on user device 210 may update the authentication application's configuration repository in a manner similar to that described with respect to block 580.

As also shown in FIG. 6, process 600 may include sending authentication information to the calling application (block 690). For example, the authentication application may send the authentication information received from the authentication server and stored in the authentication repository to the calling application. Alternatively, the authentication application may send modified authentication information, based on the authentication information received from the authentication server and stored in the authentication repository, to the calling application. The modified authentication information sent from the authentication application to the calling application may include different expiration times and/or may include information conforming to application access restrictions contained in the authentication application's configuration repository. The authentication information sent by the authentication application to the calling application may be encrypted using, e.g., the random secret key sent from the calling application with its authentication request. The calling application may then decrypt and/or store the authentication information sent by the authentication application in its own authentication repository located in memory accessible by user device 210. The authenticated user may now access protected resources using the calling application.

The authentication application may pass the encrypted authentication information from the authentication application to the calling application by invoking the calling application using a return deep link and/or by passing the encrypted authentication information through the application extension which invoked the authentication application. Alternatively, or additionally, the authentication application may pass the authentication information to the calling application by creating or modifying a monitored memory or storage location, accessible by user device 210, which may be secured to prevent access to other applications.

Figure 7A:
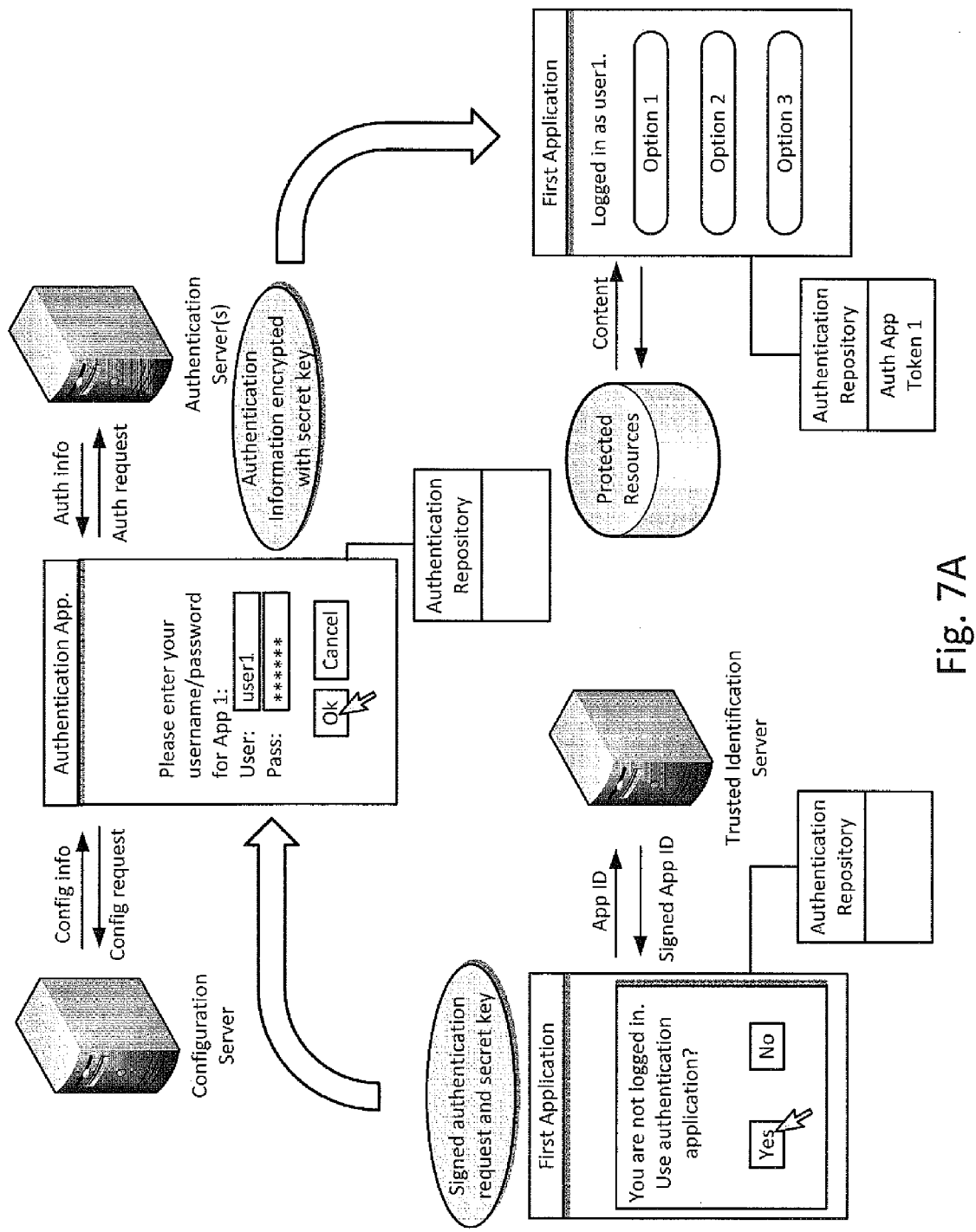
FIGS. 7A and 7B are diagrams of an example implementation relating to the example processes of FIGS. 5 and 6.

FIG. 7A is a diagram of an example implementation relating to the example processes of FIGS. 5 and 6. For example, in FIG. 7A, assume that a user of user device 210 wishes to use a first application to access protected resources. Assume further that the first application currently does not have valid authentication information in its authentication repository. Assume still further that the user may obtain access to the protected resources of the first application by authenticating with one or more authentication server(s).

As shown in FIG. 7A, the first application may prompt the user to authenticate using an authentication application after determining that its authentication repository does not contain valid authentication information. If the user chooses to authenticate using the authentication application, the first application may send a first authentication request to the authentication application. The first authentication request may be signed by a certificate from a trusted authority to verify the identity of the first application, and/or the identity of the user-first application pair, and may further include a secret key for encrypting the requested authentication information.

As also shown in FIG. 7A, the authentication application may then use configuration information obtained from a configuration server and stored in the configuration repository to determine whether and/or how the authentication application may respond to the first authentication request. This determination may include determining whether the first application is properly identified by a trusted authority, determining whether the first application is on a white-list and/or not on a black-list, and/or determining what authentication information the first application has permission to obtain.

In the example of FIG. 7A, the authentication application may determine, based on the configuration information, that the authentication application's authentication repository does not contain valid authentication information to respond to the first authentication request. The authentication application may prompt a user of user device 210 for credentials, such as a username and password, and may request authentication from one or more authentication servers, identified in the configuration information of the configuration repository, using the user's credentials. The authentication application may then store the authentication information received from the authentication server(s) in the authentication application's authentication repository and may update the configuration repository to reflect the received authentication information.

The authentication application may return authentication information to the first application. The authentication information returned to the first application from the authentication application may be the same authentication information stored in the authentication application's authentication repository or may be different authentication information created by the authentication application based on the authentication information stored in the authentication application's authentication repository. For example, the authentication application may return authentication information to the first application with a shorter expiration time than the authentication information received from the authentication server(s). As another example, the authentication application may return authentication information to the first application with more limited information than the authentication information received from the authentication server(s) based on, e.g., application permission information retrieved from the configuration repository. Alternatively, or additionally, the authentication application's authentication repository may contain multiple types of authentication information which satisfy the calling application's authentication request, and the authentication application may return a more limited or more complete type of authentication information to the calling application based on the application permission information. The authentication application may encrypt, using the secret key sent from the first application, the authentication information returned to the first application. The first application may store the authentication information returned from the authentication application in the first application's authentication repository and may use the authentication information stored in the first application's authentication repository to access the first application's protected resources.

Figure 4:
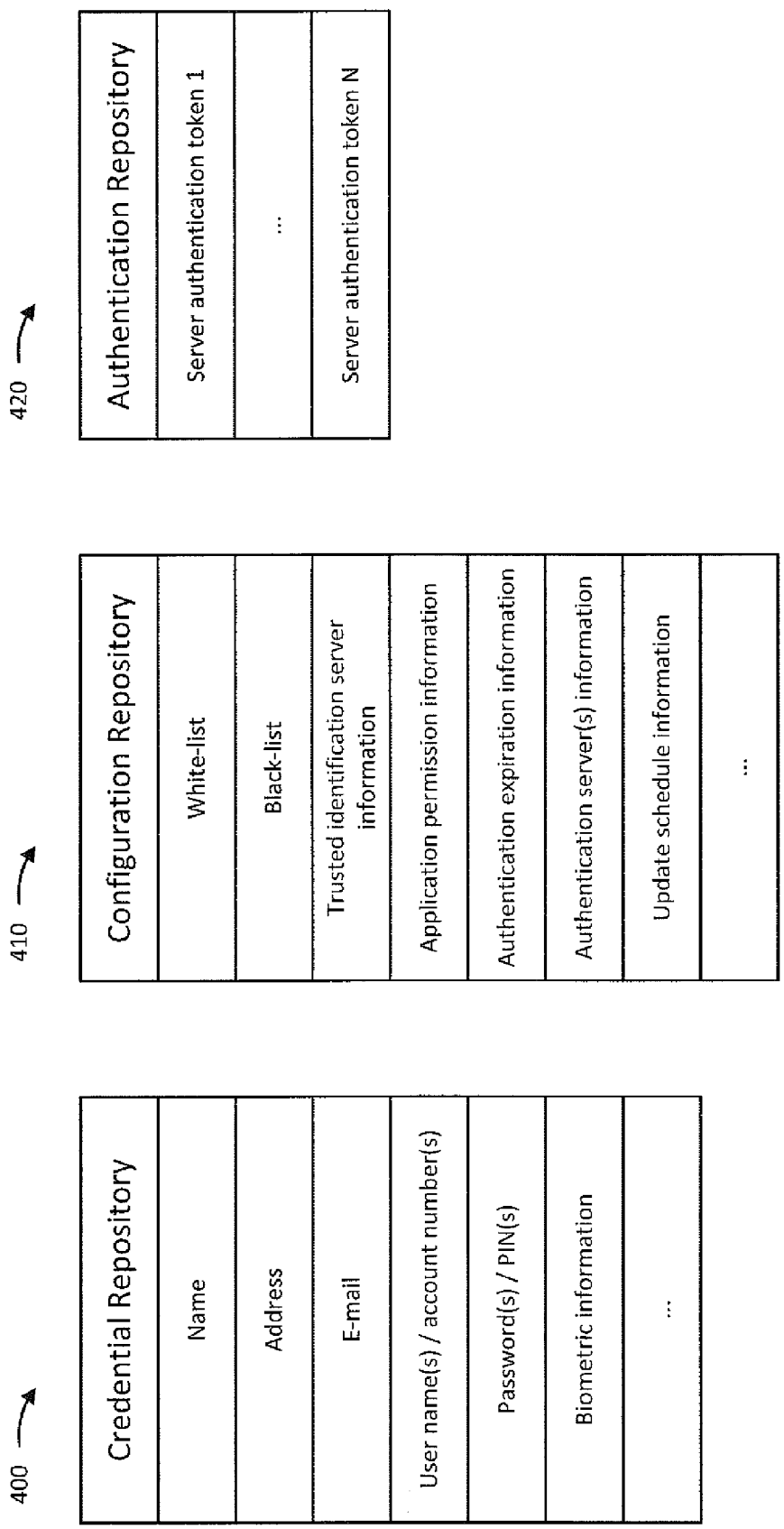
FIGS. 4A-4C are diagrams of example authentication application data structures.
Figure 7B:
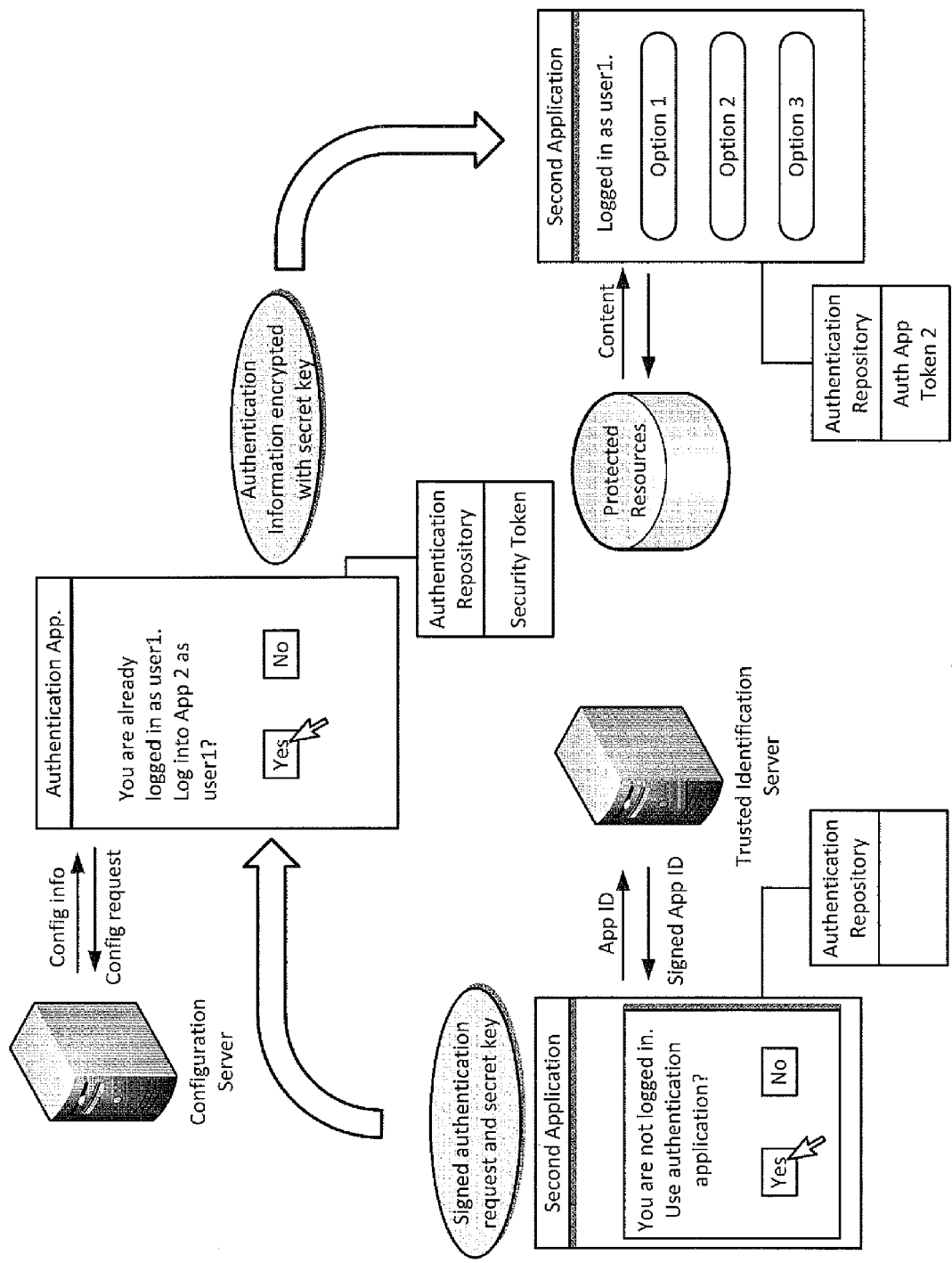

FIG. 7B is another diagram of an example implementation relating to the example processes of FIGS. 4 and 5. For example, in FIG. 7B, assume that a user of user device 210 has already obtained authentication information using an authentication application to access protected resources associated with the first application, as described above in relation to FIG. 7A. Assume further that the user now wishes to use a second application to access the second application's protected resources. Assume further that the second application does not currently have valid authentication information in the second application's authentication repository. Assume still further that the same authentication information for the first application may be used to obtain access to the protected resources of the second application.

As shown in FIG. 7B, the second application may prompt the user to authenticate using an authentication application after determining that its authentication repository does not contain valid authentication information. If the user chooses to authenticate using the authentication application, the second application may send a second authentication request to the authentication application. The second authentication request may include a signed certificate from a trusted authority to verify the identity of the second application and may further include a secret key for encrypting the authentication information requested.

As also shown in FIG. 7B, the authentication application may then use configuration information obtained from the configuration server and stored in the configuration repository to determine whether and/or how the authentication application may respond to the second authentication request. This determination may be similar to the determination made with respect to the first application, described above in relation to FIG. 7A.

In the example of FIG. 7B, the authentication application may determine, based on the configuration information, that the authentication application's authentication repository contains valid authentication information to respond to the second authentication request. The authentication application may then return authentication information to the second application. The authentication information returned to the second application from the authentication application may be the same authentication information stored in the authentication application's authentication repository, or the authentication information returned to the second application may be different authentication information created by the authentication application based on the authentication information stored in the authentication application's authentication repository.

For example, the authentication application may return authentication information to the second application with a shorter expiration time than the authentication information obtained by the authentication application from the authentication server(s). As another example, the authentication application may receive multiple portions of authentication information from the authentication server and may return, based on the configuration information, one or more particular portions of the received authentication information, which may provide variable access to one or more protected resources to the first application. The authentication application may encrypt, using the secret key sent from the second application, the authentication information returned to the second application. The second application may store the authentication information returned from the authentication application in the second application's authentication repository and may use the authentication information stored in the second application's authentication repository to access the second application's protected resources.

As indicated above, FIGS. 7A and 7B are provided merely as an example. Other examples are possible and may differ from what was described with regard to FIGS. 7A and 7B.

Implementations described herein may assist a user in authenticating in applications using an authentication application on a user device.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user device, comprising:
    a memory to store:
        first authentication information,
            the first authentication information being used to grant access to a resource associated with a first application, and
        configuration information relating to a second application,
            the second application being different than the first application,
            the first application and the second application operating on the user device; and
    one or more processors to:
        receive an authentication request, from the second application, requesting second authentication information,
        determine, based on the authentication request, that the memory stores the configuration information relating to the second application,
        determine, based on the configuration information, that the first authentication information includes a first portion of the second authentication information and does not include a second portion of the second authentication information,
        provide, to a server device and based on determining that the first authentication information does not include the second portion of the second authentication information, a request for the second portion of the second authentication information,
        receive, from the server device and based on the request, the second portion of the second authentication information,
        store the second portion of the second authentication information in the memory,
        generate an authentication response, to the authentication request, using the first authentication information and the second portion of the second authentication information, and
        send the authentication response, to the second application, to permit access to a resource associated with the second application.

2. The user device of claim 1, where the one of more processors are further to:
    send a configuration request to a configuration server,
    receive, based on the configuration request, a configuration response from the configuration server, and
    update, based on the configuration response, the configuration information.

3. The user device of claim 2, where the one of more processors are further to:
    encrypt the configuration request sent to the configuration server, and
    decrypt the configuration response received from the configuration server.

4. The user device of claim 1, where the configuration information stored in the memory further includes:
    expiration information for the first authentication information; and
    the one or more processors are further to:
        determine whether some or all of the first authentication information is expired based on the expiration information, and
        send a server authentication request to an authentication server based on determining that some or all of the first authentication information is expired.

5. The user device of claim 1, where the memory is further to store:
    user credential information; and
    the one or more processors are further to:
        send a server authentication request, based on the user credential information and the authentication request, to an authentication server.

6. The user device of claim 1, where the configuration information stored in the memory includes:
    at least one of a white-list or a black-list; and
    the one or more processors, when determining that the memory stores the configuration information relating to the second application, are to:
        determine at least one of:
            that the second application is identified in the white-list, or
            that the second application is not identified in the black-list.

7. The user device of claim 1, where the one or more processors are further to:
    encrypt the authentication response, using a key included with the authentication request, before sending the authentication response.

8. A non-transitory computer-readable medium storing instructions, the instructions comprising:
    a plurality of instructions that, when executed by a processor of a device, cause the processor to:
        store, in the device, first authentication information that is used to grant access to a resource associated with a first application;

store, in the device, configuration information relating to a second application,
    the second application being different than the first application;
receive an authentication request, from the second application, requesting second authentication information;
determine, based on the authentication request, that the device stores the configuration information relating to the second application;
determine, based on the configuration information, that the first authentication information includes a first portion of the second authentication information and does not include a second portion of the second authentication information,
    the second authentication information being used to grant access to a resource associated with the second application;
provide, to a server device and based on determining that the first authentication information does not include the second portion of the second authentication information, a request for the second portion of the second authentication information;
receive, from the server device and based on the request, the second portion of the second authentication information;
generate an authentication response, to the authentication request, using the first authentication information and the second portion of the second authentication information; and
send the authentication response, to the second application, to permit access to the resource associated with the second application.

9. The non-transitory computer-readable medium of claim 8, where the plurality of instructions, which when executed by the processor, cause the processor, when sending the authentication response, to:
    send the authentication response via one or more deeplinks.

10. The non-transitory computer-readable medium of claim 8, where the plurality of instructions, which when executed by the processor, cause the processor, when sending the authentication response, to:
    send the authentication response via one or more application extensions.

11. The non-transitory computer-readable medium of claim 8, where the plurality of instructions, which when executed by the processor, cause the processor, when sending the authentication response, to:
    send the authentication response by storing the authentication response in one or more locations in a memory accessible to the second application.

12. The non-transitory computer-readable medium of claim 8, where the plurality of instructions, which when executed by the processor, further cause the processor to:
    determine, based on the configuration information, whether the second authentication information does not relate to the first authentication information, and
    based on determining that the second authentication information does not relate to the first authentication information:
        obtain user credential information,
        send, based on the authentication request and the user credential information, a server authentication request, to an authentication server, requesting some or all of the first authentication information not contained in the second authentication information,
        receive, based on the server authentication request, a server authentication response, from the authentication server, including some or all of the first authentication information requested in the server authentication request,
        update the second authentication information, as updated authentication information, to include the first authentication information received in the server authentication response,
        update the configuration information using the updated authentication information, and
        generate the authentication response based on the updated authentication information.

13. The non-transitory computer-readable medium of claim 8, where the plurality of instructions, which when executed by the processor, cause the processor, when sending the authentication response to the first application, to:
    set an expiration for the authentication response that is sooner than an expiration for the second authentication information.

14. The non-transitory computer-readable medium of claim 8, where the plurality of instructions, which when executed by the processor, further cause the processor to:
    verify, based on cryptographic information contained in the authentication request, an identity of the first application,
    identify, based on the verified identity, the configuration information relating to the first application, and
    identify, based on the identified configuration information, the first authentication information requested by the authentication request.

15. A method, comprising:
    storing, by a device, first authentication information that is used to grant access to a resource associated with a first application;
    storing, by the device, configuration information relating to a second application,
        the second application being different than the first application,
        the first application and the second application operating on the device;
    receiving, by the device, an authentication request from the second application,
        the authentication request requesting second authentication information and corresponding to a request for access to a resource associated with the second application;
    determining, by the device and based on the authentication request, that the device stores the configuration information relating to the second application;
    determining, by the device and based on the configuration information, that the first authentication information includes a first portion of the second authentication information and does not include a second portion of the second authentication information,
        the second authentication information being used by the second application to access to the resource associated with the second application;
    providing, by the device, to a server device, and based on determining that the first authentication information does not include the second portion of the second authentication information, a request for the second portion of the second authentication information;
    receiving, by the device, from the server device, and based on the request, the second portion of the second authentication information;

generating, by the device, an authentication response, to the authentication request, using the first authentication information and the second portion of the second authentication information; and sending, by the device, the authentication response, to the second application, to permit access to the resource associated with the second application.

16. The method of claim 15, further comprising:
generating, based on the authentication request, a server authentication request;
encrypting the server authentication request;
sending the encrypted server authentication request to the server device;
receiving, based on the encrypted server authentication request, an encrypted server authentication response, from the server device;
decrypting the encrypted server authentication response; and
generating, based on the decrypted server authentication response, the authentication response.

17. The method of claim 16, where generating the server authentication request corresponds to the request for the second portion of the second authentication information.

18. The method of claim 15, further comprising:
updating the configuration information according to an update schedule.

19. The method of claim 15, further comprising:
updating the configuration information based on receiving the authentication request.

20. The method of claim 15, further comprising:
determining, based on permission information for the second authentication information and the configuration information, whether the second application is permitted to receive some or all of the first authentication information; and
generating the authentication response, to the authentication request, based on some or all of the first authentication information that the second application is permitted to receive.

* * * * *